(12) United States Patent
Niskanen et al.

(10) Patent No.: US 9,118,413 B2
(45) Date of Patent: Aug. 25, 2015

(54) APPARATUS AND A METHOD

(71) Applicant: Nokia Corporation, Espoo (FI)

(72) Inventors: Antti Niskanen, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 299 days.

(21) Appl. No.: 13/721,712

(22) Filed: Dec. 20, 2012

(65) Prior Publication Data

US 2014/0178063 A1 Jun. 26, 2014

(51) Int. Cl.
*H04B 10/079* (2013.01)
*H04B 10/077* (2013.01)

(52) U.S. Cl.
CPC ............ *H04B 10/077* (2013.01); *H04B 10/079* (2013.01)

(58) Field of Classification Search
USPC .......................................................... 398/16
See application file for complete search history.

(56) References Cited

U.S. PATENT DOCUMENTS

| 5,307,146 A | 4/1994 | Porter et al. .................. 356/320 |
| 5,760,901 A | 6/1998 | Hill ............................. 356/345 |
| 2003/0165185 A1 | 9/2003 | Arima et al. .................. 375/147 |
| 2003/0198201 A1 | 10/2003 | Ylitalo et al. ................. 370/329 |
| 2004/0013172 A1 | 1/2004 | Hashiguchi et al. .......... 375/148 |
| 2008/0106745 A1 | 5/2008 | Haber et al. .................. 356/519 |
| 2009/0226129 A1 | 9/2009 | Kuipers et al. ................. 385/14 |
| 2011/0129232 A1* | 6/2011 | Dou et al. ...................... 398/183 |

OTHER PUBLICATIONS

Technical Reference Selection Guide, Omega Engineering, Turbidity Measurement, www.omega.com, Nov. 30, 2012, 4 pgs.
Chao, Chung-Yen, et al., "Biochemical sensors based on polymer microrings with sharp asymmetrical resonance", © 2003 American Institute of Physics, Applied Physics Letters, vol. 83, No. 8, Aug. 25, 2003, 3 pgs.
A Survey of Methods Using Balanced Photodetection, www.newport.com, Nov. 30, 2012, 7 pgs.
Hu, Juejun, et al., "Design guidelines for optical resonator biochemical sensors", Microphotonics Center, MA Institute of Technology, Cambridge, MA, Jun. 27, 2003, 37 pgs.

\* cited by examiner

*Primary Examiner* — Shi K Li
(74) *Attorney, Agent, or Firm* — Harrington & Smith

(57) ABSTRACT

An apparatus including: addition circuitry configured to receive simultaneously a probe signal that has passed through a channel having a complex transmission and a reference signal and configured to produce at least: a plurality of weighted additions including an addition of the probe signal and the reference signal with different relative phase rotations between the probe signal and the reference signal for each weighted addition; and processing circuitry configured to use at least two of the plurality of weighted additions to determine a first quantitative parameter for the channel dependent upon the complex transmission for the channel.

19 Claims, 6 Drawing Sheets

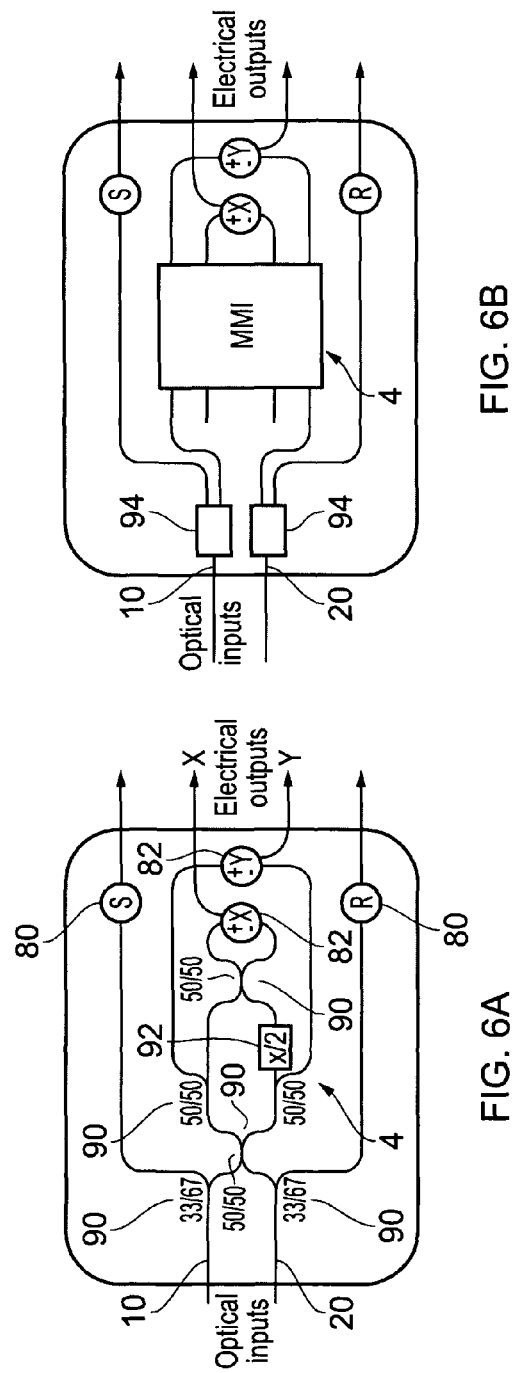
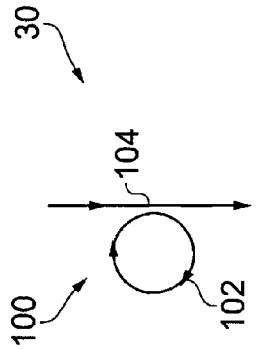
FIG. 6B
FIG. 6A
FIG. 7

APPARATUS AND A METHOD

TECHNOLOGICAL FIELD

Embodiments of the present invention relate to an apparatus and a method. In particular, they relate to an apparatus for determining one or more quantitative parameters for a channel.

BACKGROUND

It is known to measure a parameter of a channel by passing a probe signal through the channel and measure a parameter of the probe signal.

This technique is, however, sensitive to fluctuations in the probe signal, the correlation between the parameter of the probe signal and the parameter of the channel and the ability to accurately measure the parameter of the probe signal.

BRIEF SUMMARY

According to various, but not necessarily all, embodiments of the invention there is provided an apparatus comprising: addition circuitry configured to receive a probe signal that has passed through a channel having a complex transmission and a reference signal and configured to produce at least: a plurality of weighted additions comprising an addition of the probe signal and the reference signal with different relative phase rotations applied before addition between the probe signal and the reference signal and processing circuitry configured to use at least two of the plurality of weighted additions to determine a first quantitative parameter for the channel dependent upon the complex transmission for the channel.

According to various, but not necessarily all, embodiments of the invention there is provided a method comprising: receiving a probe signal that has passed through a channel having a complex transmission; receiving a reference signal; combining the probe signal and the reference signal, after applying a first phase rotation between the probe signal and the reference signal, to produce a first resultant signal; combining the probe signal and the reference signal, after applying a second phase rotation between the probe signal and the reference signal, to produce a second resultant signal; and using at least the first resultant signal and the second resultant signal to determine a first quantitative parameter for the channel dependent upon the complex transmission for the channel.

According to various, but not necessarily all, embodiments of the invention there is provided an apparatus comprising: addition circuitry configured to receive a probe signal that has passed through a channel having a complex transmission and a reference signal and configured to produce at least: a plurality of weighted additions comprising an addition of the probe signal and the reference signal, wherein a differential complex weighting is applied before addition to one of the probe signal and the reference signal but not to the other of the probe signal and the reference signal, and wherein each of the plurality of weighted additions uses a different differential complex weighting; and processing circuitry configured to use at least two of the plurality of weighted additions to determine a first quantitative parameter for the channel dependent upon the complex transmission for the channel.

BRIEF DESCRIPTION

For a better understanding of various examples of embodiments of the present invention reference will now be made by way of example only to the accompanying drawings in which:

FIGS. 6A and 6B illustrate different examples of the addition circuitry;

FIG. 7 illustrates an example of a channel having a complex transmission;

DETAILED DESCRIPTION

Figure 1:
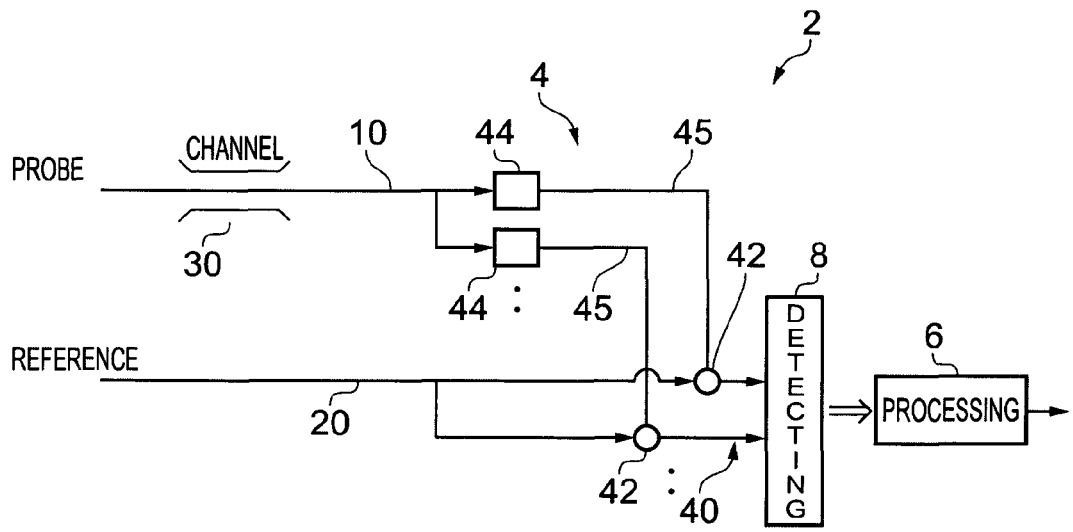
FIG. 1 illustrates an apparatus for determining one or more quantitative parameters dependent upon a complex transmission of a channel.

The Figures illustrate an apparatus 2 comprising: addition circuitry 4 configured to receive a probe signal 10 that has passed through a channel 30 having a complex transmission and a reference signal 20 and configured to produce at least: a plurality of weighted additions 40 comprising an addition 42 of the probe signal 10 and the reference signal 20 with different relative phase rotations applied before addition between the probe signal 10 and the reference signal 20; and processing circuitry 6 configured to use at least two of the plurality of weighted additions 40 to determine a first quantitative parameter for the channel 30 dependent upon the complex transmission for the channel.

FIG. 1 illustrates an apparatus 2 for determining one or more quantitative parameters dependent upon a complex transmission of a channel 30. The apparatus 2 may therefore be used in a system that measures the complex transmission of the channel 30 or measures changes in the complex transmission of the channel 30.

Particular changes to the complex transmission of the channel 30 may occur because of particular events and the apparatus 2 may be configured to detect those particular events by detecting those particular changes to the complex transmission of the channel 30.

Transmission may be quantified using a transmission coefficient T that represents the amplitude ($|T|$) and phase relationship ($\phi$) between an amplitude Ai of an electromagnetic wave input into the channel 30 and an amplitude Ao of the electromagnetic wave that is consequentially output from the channel 30.

$$T=|T|\exp(i\phi)=Ao/Ai$$

Addition circuitry 4 is configured to receive simultaneously the probe signal 10 and also a reference signal 20.

In some but not necessarily all embodiments, the addition circuitry 4 divides the probe signal 10 into equal parts and the reference signal 20 into equal parts.

Each of the parts of the reference signal 20 has a corresponding associated part of the probe signal 10

The addition circuitry 4 applies a different relative phase rotation 44 between the corresponding parts of the probe signal 10 and the reference signal 20.

In the example of FIG. 1, a different phase rotation is illustrated as being applied to each of the different parts of the probe signal 10 (with no phase rotation being applied to the reference signal 20). However, this is only illustrative absolute phase rotations may be applied to only the parts of the probe signal 10, only the parts of the reference signal 20 or to both the parts of the probe signal 10 and the parts of the reference signal 20. However, the relative phase difference applied between the parts of the probe signal 10 and the corresponding parts of references signal 20 is different for each part.

The addition circuitry 4, in the particular illustrated example, applies to each part of the probe signal 10 a differential complex weighting 44 to form a weighted probe signal 45.

In this example the differential complex weightings 44 applied to the parts of the probe signal 10 are represented as differential (rather than absolute) weightings. That is they represent a phase difference (rotation) applied between a part of the probe signal 10 and the corresponding part of the reference signal 20. As a consequence no differential weightings are illustrated as applied to the parts of the reference signal 20.

The addition circuitry 4 adds each of the weighted probe signals 45 of the probe signal 10 to its corresponding part of the reference signal 20 to create a plurality of weighted additions in the form of resultant signals 40.

Each resultant signal 40 is a weighted addition comprising an addition 42 of the probe signal 10 and the reference signal 20, where a differential complex weighting 44 is applied before addition to one of the probe signal 10 and the reference signal 20 but not to the other of the probe signal 10 and the reference signal 20. Each of the plurality of weighted additions 40 uses a different differential complex weighting 44.

Detection circuitry 8 detects the resultant signals 40 and, in this example, provides intensity values of the resultant signals to the processing circuitry 6.

The processing circuitry 6 is configured to use at least two of the detected plurality of weighted additions 40 to determine a first quantitative parameter for the channel 30 dependent upon the complex transmission T of the channel 30.

It is important to note that each of the plurality of weighted additions 40 comprises an addition, differently weighted, of the same probe signal 10 and the same reference signal 20 and that those probe signal 10 and reference signal 20 are contemporaneously (simultaneously) detected.

The differential complex weighting 44 introduces a phase difference (rotation). It may, for example, introduce only a phase difference and no significant amplitude change. Alternatively it may additionally introduce a known amplitude change.

Figure 2:
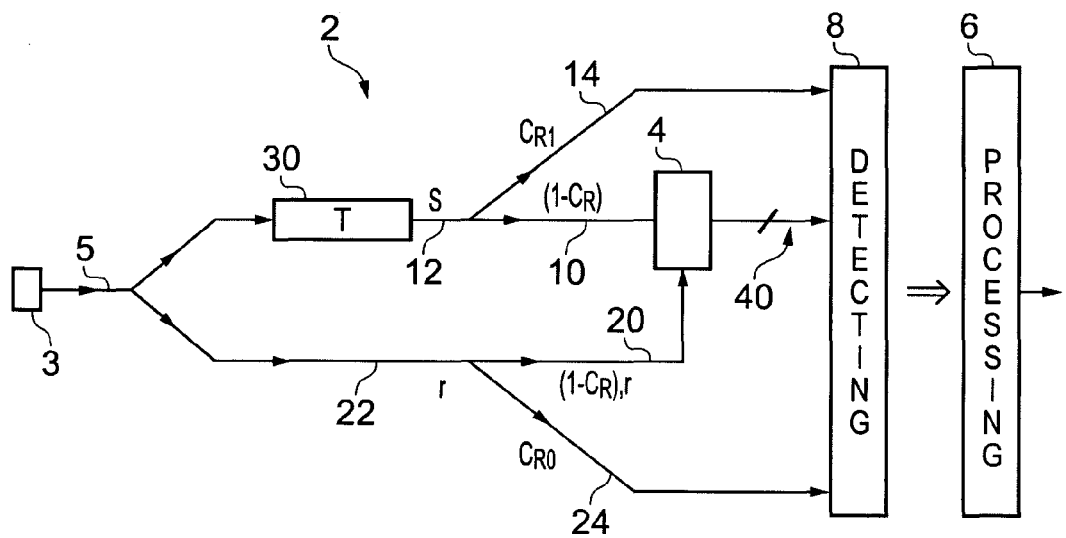
FIG. 2 illustrates an example of an apparatus that detects and measures additional signals.

FIG. 2 illustrates an example of the apparatus 2 that detects and measures additional signals. A source 3 produces a signal 5. The source 3 is, in this example, a fixed wavelength electromagnetic wave source. In some but not necessarily all examples, the source 3 may also be a low intensity optical source.

The signal 5 is divided into a first probe signal 12 and a first reference signal 22. The ratio of division, in the example, is 50:50.

The first probe signal 12 passes through the channel 30. After it has passed through the channel 30 the signal has a value s.

The first probe signal 12 is then divided into the probe signal 10 and a second probe signal 14. The ratio of division, in the example, is $(1-c_R): c_R$ by intensity.

The intensity of the second probe signal 14 therefore has a value $c_R \cdot |s|^2$. The intensity of the probe signal 10 therefore has a value $(1-c_R) \cdot |s|^2$.

The second probe signal 14 is provided to the detection circuitry 8, where the intensity of the second probe signal 14 is detected. The detected intensity S has a value equal to $c_R \cdot |s|^2$. The value S is provided to the processing circuitry 6, where $$S = c_R \cdot |s|^2 = c_R \cdot |r|^2 |T|^2 \qquad \text{Equation 1}$$

The first reference signal 22 does not pass through the channel 30. It has a value r.

The first reference signal 22 is then divided into the reference signal 20 and a second reference signal 24. The ratio of division, in the example, is $(1-c_R): c_R$ by intensity. The intensity of the second probe signal 24 therefore has a value $c_R \cdot |r|^2$ The second reference signal 24 is provided to the detection circuitry 8, where the intensity of the second reference signal 24 is detected. The detected intensity R has a value equal to $c_R \cdot |r|^2$. The value R is provided to the processing circuitry 6, where $$R = c_R \cdot |r|^2 \qquad \text{Equation 2}$$

The probe signal 10 and the reference signal 20 are both provided to addition circuitry 4, as described in relation to FIG. 1.

The addition circuitry 4 produces a plurality of weighted additions in the form of resultant signals 40. Each resultant signal is a weighted addition comprising an addition of the probe signal 10 and the reference signal 20, where a differential complex weighting is applied before addition to one of the probe signal 10 and the reference signal 20 but not to the other of the probe signal 10 and the reference signal 20. Each of the plurality of weighted additions 40 uses a different differential complex weighting 44.

Figure 4A:
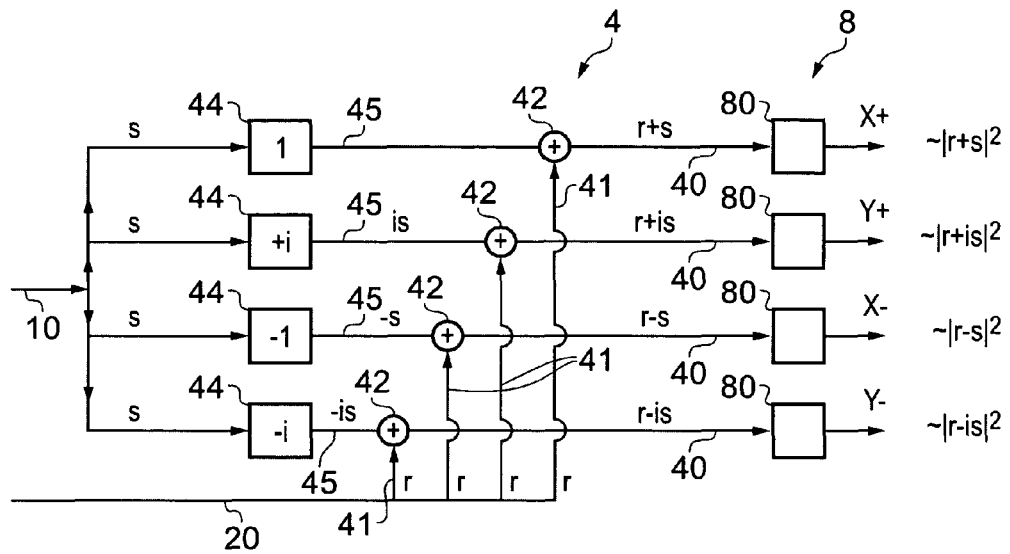
FIGS. 4A and 4B illustrate an example of (the same) addition circuitry used with different detection circuitry.
Figure 4B:
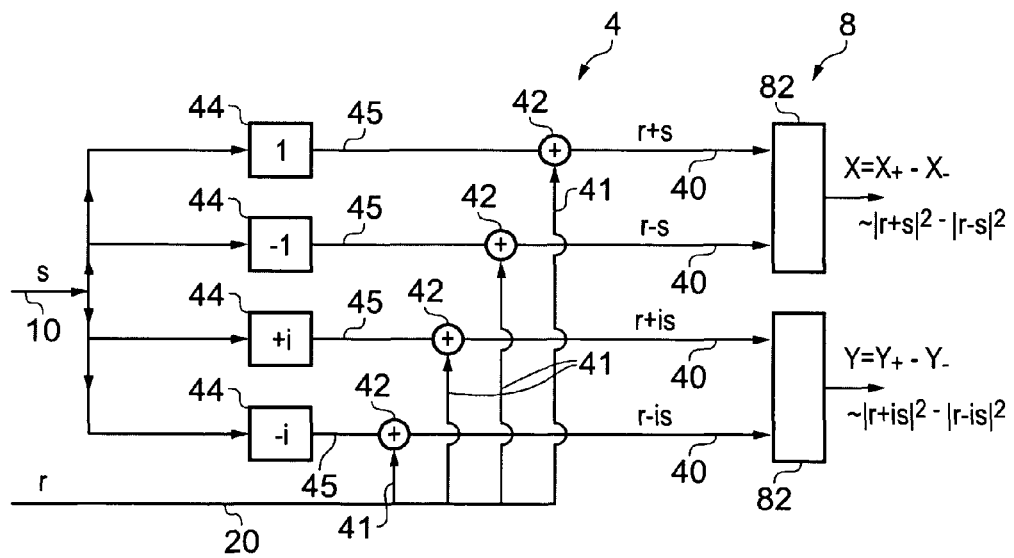

FIGS. 4A and 4B illustrate an example of (the same) addition circuitry 4 used with different detection circuitry 8.

In this example of the addition circuitry 4, the complex differential weightings 44 applied to each of the parts of the probe signal 10 are relative rotations in the complex plane of $m \cdot \pi 2$ where m is 0, 1, 2, 3.

A first complex differential weighting of 1 (unity) is applied to a first part of the probe signal 10 to produce a first weighted probe signal 45. The first weighted probe signal 45 (s) is added to the corresponding part 41 (r) of the reference signal 20 to produce as a first resultant signal 40 a first weighted addition (r+s). This is equivalent to an in-phase addition of the probe signal 10 and the reference signal 20.

A second complex differential weighting of i is applied to a second part of the probe signal 10 to produce a second weighted probe signal 45 (is). The second complex differential weighting introduces a phase difference (rotation) of $\pi/2$ relative to the first complex differential weighting. The second weighted probe signal 45 (is) is added to the corresponding part 41 (r) of the reference signal 20 to produce as a second resultant signal 40 a second weighted addition (r+is).

A third complex differential weighting of −1 is applied to a third part of the probe signal 10 to produce a third weighted probe signal 45 (−s). This third complex differential weighting introduces a phase difference (rotation) of π relative to the first complex differential weighting. The third weighted probe signal 45 (−s) is added to the corresponding part 41 (r) of the reference signal 20 to produce as a third resultant signal 40 a third addition (r−s).

A fourth complex differential weighting of −i is applied to a fourth part of the probe signal 10 to produce a fourth weighted probe signal 45 (−is). This fourth complex differential weighting introduces a phase difference (rotation) of $3\pi/2$ relative to the first complex differential weighting. The fourth weighted probe signal 45 (−is) is added to the corresponding part 41 (r) of the reference signal 20 to produce as a fourth resultant signal 40 a fourth addition (r−is).

In FIG. 4A, a detector 80 is used to detect an intensity X+ of the first resultant signal 40 and provide it to the processing circuitry 6, where $$X+ = \tfrac{1}{4}(1-c_R)|r+s|^2 \qquad \text{Equation 3A}$$

A further detector 80 is used to detect an intensity Y+ of the second resultant signal 40 and provide it to the processing circuitry 6, where $$Y+ = \tfrac{1}{4}(1-c_R)|r+is|^2 \qquad \text{Equation 3B}$$

Another detector 80 is used to detect an intensity X− of the third resultant signal and provide it to the processing circuitry 6, where $$X- = \tfrac{1}{4}(1-c_R)|r-s|^2 \qquad \text{Equation 3C}$$

A further detector 80 is used to detect an intensity Y− of the fourth resultant signal and provide it to the processing circuitry 6, where $$Y- = \tfrac{1}{4}(1-c_R)|r-is|^2 \qquad \text{Equation 3D}$$

Figures 5A, 5B:
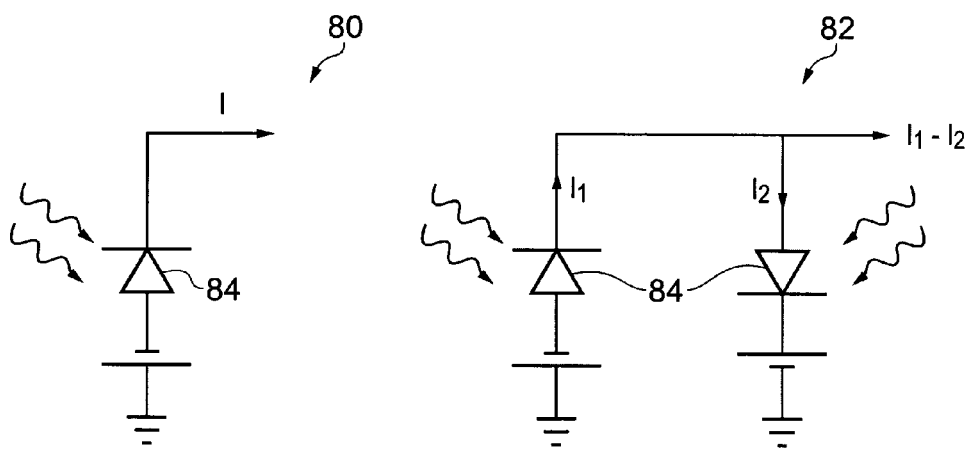
FIGS. 5A and 5B illustrate different examples of detectors suitable for use in the detection circuitry.

FIG. 5A illustrates an example of a detector 80 suitable for use in the detection circuitry 8 of FIG. 4A. The detector 80 comprises a reverse biased photo-diode 84.

In FIG. 4B, a balanced detector 82 is used to detect a difference X between the intensity X+ of the first resultant signal 40 and the intensity X− of the third resultant signal 40. It provides the difference X to the processing circuitry 6, where $$\begin{aligned} X &= X+ - X- & \text{Equation 5A}\\ &= 1/4(1-c_R)(|r+s|^2 - |r-s|^2)\\ &= (1-c_R)\cdot \text{Re}(r\cdot s)\\ &= r^2(1-c_R)\cdot \text{Re}(T) \end{aligned}$$

A balanced detector 82 is used to detect a difference Y between the intensity Y+ of the second resultant signal 40 and the intensity Y− of the fourth resultant signal 40. It provides the difference Y to the processing circuitry 6, where $$\begin{aligned} Y &= Y+ - Y- & \text{Equation 5B}\\ &= 1/4(1-c_R)(|r+is|^2 - |r-is|^2)\\ &= (1-c_R)\cdot \text{Im}(r\cdot s)\\ &= r^2(1-c_R)\cdot \text{Im}(T) \end{aligned}$$

FIG. 5B illustrates an example of a balanced detector 82 suitable for use in the detection circuitry 8 of FIG. 4B. The detector 82 comprises a reverse biased photo-diode detector 84 connected in electrical parallel to a forward biased photo-diode detector 84. The reverse biased photo-diode 84 provides an output current $I_1$ and the forward biased photo-diode 84 provides an output current of $-I_2$. These individual output currents are added to produce as an output from the balanced detector 82 the current $I_1-I_2$.

Referring back to FIG. 4B, the first balanced detector 82 may comprise a photo-diode detector 84 configured to detect a first intensity X+ of a signal 40 corresponding to the first weighted addition and a photo-diode detector 84 configured to detect a third intensity X− of the signal 40 corresponding to the third weighted addition. The first balanced detector 82 is configured to provide as a first input to the processing circuitry 6 a difference X between the first intensity X+ and the third intensity X−.

The second balanced detector 82 may comprise a photo-diode detector 84 configured to detect a second intensity Y+ of an signal 40 corresponding to the second weighted addition and a photo-diode detector 84 configured to detect a fourth intensity Y− of an signal 40 corresponding to the fourth weighted addition. The second balanced detector 82 is configured to provide as a second input to the processing circuitry 6 a difference Y between the second intensity Y+ and the fourth intensity Y−.

The use of balanced detectors can reject common noise introduced by the detectors.

Referring back to FIGS. 1 and 2, the processing circuitry 6 is configured to use at least two of the intensities of the resultant signals (weighted additions) 40 and at least one further signal to determine quantitatively one or more of: a phase of the complex transmission; the complex transmission; mean of the squared transmission; square of the mean transmission; variance of the transmission; and a complex refractive index of the channel.

If the processing circuitry 6 is configured to use only two of the intensities of the resultant signals 40, then the two resultant signals should not be in phase or anti-phase, that is, there should be complex differential weighting, with a non-zero imaginary component, applied to the probe signals of the two resultant signals. The differential weighting may, for example, correspond to a relative phase rotation of $(2n+1)\pi/2$ where n is 0, 1, 2, 3.

The complex transmission coefficient T of the channel 30 may be defined as:

$$T = |T|\exp(i\phi) \qquad \text{Equation 6}$$

When the source amplitude r(t) fluctuates, the measurements are actually averages over the detection time. For the embodiment of FIG. 4B, using Equations 1 and 2, $(\langle S\rangle/\langle R\rangle)^{1/2} = c_R \cdot \langle |r(t)|^2 \rangle |T|^2 \rangle = |T|$ where $\langle \ \rangle$ indicates an average or integration. The term $\langle |r(t)|^2 \rangle$ is the same for $\langle S\rangle$ and $\langle R\rangle$ only when the measurements are simultaneous.

Therefore $|T|$ may be determined from the ratio of the intensity S of the second probe signal 14 and the intensity R of the simultaneous second reference signal 24.

Using Equations 5A, 5B and 6, $\phi = \arctan(\langle X\rangle/\langle Y\rangle)$.

Therefore $\phi$ may be determined from the ratio where the numerator is the difference X between the intensity X+ of the first resultant signal 40 and the intensity X− of the third resultant signal 40 and the denominator is the difference Y between the intensity Y+ of the second resultant signal 40 and the intensity Y− of the fourth resultant signal 40.

Using Equations 5A, 5B and 2, $T = (\langle X\rangle/\langle R\rangle + i\langle Y\rangle/\langle R\rangle)\cdot c_R/(1-c_R)$.

Therefore T may be determined from the difference X between the intensity X+ of the first resultant signal 40 and the intensity X− of the third resultant signal 40, the difference Y between the intensity Y+ of the second resultant signal 40 and the intensity Y− of the fourth resultant signal 40 and the parameter $c_R$. This parameter may be fixed and known.

Using Equations 5A, 5B and 2, $|T|^2 = (\langle X\rangle^2 + \langle Y\rangle^2)\cdot [c_R/(\langle R\rangle(1-c_R))]^2$.

Therefore $|T|^2$ may be determined from the difference X between the intensity X+ of the first resultant signal 40 and the intensity X− of the third resultant signal 40, the difference Y between the intensity Y+ of the second resultant signal 40 and the intensity Y− of the fourth resultant signal 40, the parameter $c_R$ and the intensity R of the second reference signal 24.

Therefore from $|T|^2$ and T, the variance $\sigma^2$ of the transmission coefficient T may be determined: $\sigma^2 = <T^2> - <T>^2$.

For the embodiment of FIG. 4A, using Equation 1 and 2, $|T| = (<S>/<R>)^{1/2}$.

Therefore $|T|$ may be determined from the ratio of the intensity S of the second probe signal 14 and the intensity R of the second reference signal 24.

Using Equations 5A, 5B and 6, $\phi = \arctan(<X>/<Y>)$.

Therefore $|T|$ may be determined from the ratio of the difference X between the intensity X+ of the first resultant signal and the intensity X− of the third resultant signal and the difference Y between the intensity Y+ of the second resultant signal and the intensity Y− of the fourth resultant signal.

It is also possible to determine quantitative parameters without using both S and R and without using all of the intensities of the resultant signals 40 (X+, Y+, X−, Y−)

For example, referring to FIG. 4B and FIG. 2, the processing circuitry 6 may receive R, X and Y but not S.

It is possible to determine $\phi = \arctan(<X>/<Y>)$.

It is possible to use Equations 5A, 5B and 2 to determine T $$T = (<X>/<R> + i<Y>/<R>) \cdot c_R/(1-c_R)$$

It is possible to use Equations 5A, 5B and 2 to determine $|T|^2$ $$|T|^2 = (<X>^2 + <Y>^2) \cdot [c_R/(<R>(1-c_R))]^2$$

It is possible to use $|T|^2$ and T to determine the variance of the transmission coefficient $\sigma^2 = <T^2> - <T>^2$ For example, referring to FIG. 4A and FIG. 2, the processing circuitry 6 may receive R, X+ and Y+ and S but not X− and Y−.

It is noteworthy that the intensity of the resultant signals 40 used are a pair of orthogonal resultant signals i.e. X+ and Y+, or X+ and Y−, or X− and Y− or X− and Y+. The differential weightings of the pulse signals between the pairs correspond to a phase rotation of $(2n+1)\pi/2$ where n is a whole number.

It is possible to use Equations 3A and 3B, 6, 1 and 2 to determine $$\phi = \arctan(<X>+/(1-c_R)-(<R>+<S>)/c_R)/-(<R>-<S>)/c_R-<Y>+/(1-c_R))$$

It is possible to use Equations 1 and 2 to determine $$|T| = (<S>/<R>)^{1/2}$$

Figure 3:
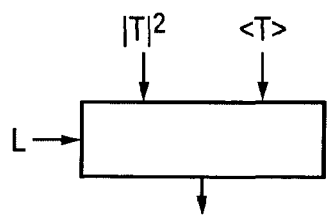
FIG. 3 illustrates a method that may be performed by processing circuitry.

FIG. 3 illustrates a method that may be performed by the processing circuitry 6 in some but not necessarily all examples.

Where fluctuations of the refractive index $\eta$ of the channel 30 are small compared to fluctuations of a wavelength of the source 3, one can use the measured values of $<T>$ and $<|T^2|>$ to obtain the refractive index. If one assumes a theoretical transmission $T(\lambda_0 + \Delta\lambda, \eta)$ and a source frequency distribution $L(\Delta\lambda)$, then:

$$<Re(T)> = Re(T) * L$$

$$<Im(T)> = Im(T) * L$$

$$<|T|^2> = |T|^2 * L$$

where * is the convolution.

The value of $\Delta\lambda$ and the complex value of $\eta$ can be worked out by using them as fitting parameters in the three equations above to match the measurements.

FIG. 6A illustrates an example of the addition circuitry 4 which is configured to cross-couple the probe signal 10 and the reference signal 20 using a plurality of directional couplers 90 and at least one phase shifter 92.

FIG. 6B illustrates an example of the addition circuitry 4 which is configured to cross-couple the probe signal 10 and the reference signal 20 using a 4×4 multi-mode interferometer (MMI).

In the implementations of the examples illustrated in FIGS. 6A and 6B, the probe signal 10 and the reference signal 20 are interchangeable as the addition circuitry introduces different relative phase rotations between the probe signal 10 and the reference signal 20 before addition.

FIG. 7 illustrates an example of a channel 30 having a complex transmission. This channel 30 comprises a photonic microring resonator 100.

The microring resonator 100 comprises a ring waveguide 102 coupled with an input/output waveguide 104. Resonance occurs when the phase added by a circuit of the ring waveguide 102 is equal to $+/-2n\pi$, where n is a natural number (1, 2 ...).

The Q-factor of the microring resonator (a measure of its ability to store energy) may be controlled by adjusting the coupling between the ring waveguide 102 and the input/output waveguide 104, for example, by changing the distance between them.

A microring resonator 100 may be configured to have a complex transmission dependent upon a bulk change of the apparatus 2. That is a change that affects the bulk of the apparatus.

For example, if the pervasive ambient environment (e.g. temperature, electric field, magnetic field) of the apparatus 2 changes then the microring resonator 100 may be configured to have a corresponding change in complex transmission.

For example, if the apparatus 2 is strained by flexing then the microring resonator 100 may be configured to have a corresponding change in complex transmission.

A microring resonator 100 may be configured to have a complex transmission dependent upon a surface change of the apparatus 2.

For example, if the exterior ambient environment (e.g. atmosphere) of the apparatus 2 changes then the microring resonator 100 may be configured to have a corresponding change in complex transmission.

A microring resonator 100 may be configured to have a complex transmission that is dependent upon one of temperature, pH, humidity, strain, displacement, rotation, electric field, magnetic field, chemical species, bio-chemical etc.

Figure 8:
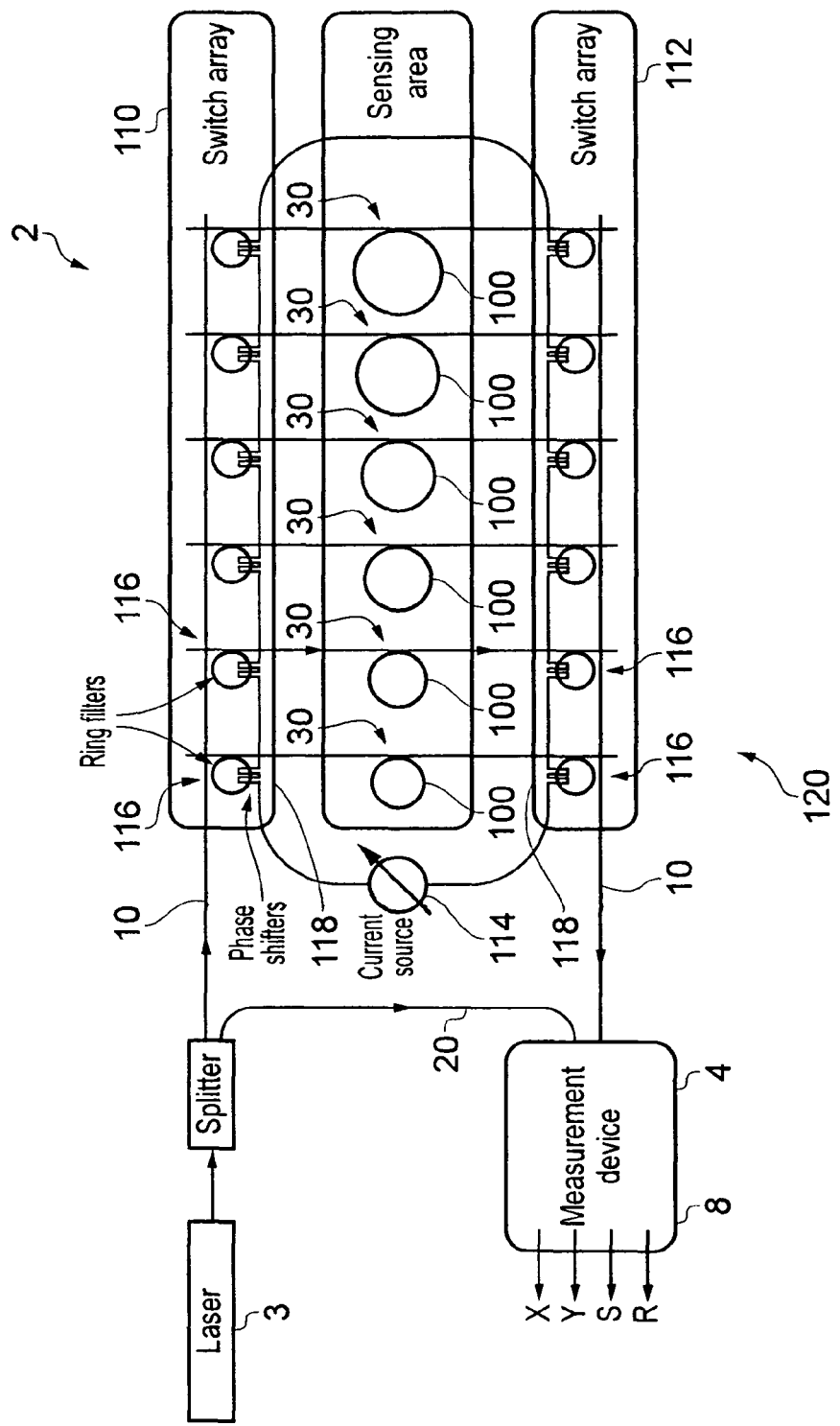
FIG. 8 illustrates an example of an apparatus in which selection circuitry is configured to select which of a plurality of parallel channels is selected for probing by the probe signal.

FIG. 8 illustrates an example of an apparatus 2 in which selection circuitry 120 is configured to select which of a plurality of parallel channels 30 is selected for probing by the probe signal 10.

Each of the channels 30 comprises a different photonic microring resonator 100 that has a different characteristic. For example, each photonic microring resonator 100 may have a different resonant frequency. For example, each photonic microring resonator 100 may have a different Q-factor.

The selection circuitry 120, in this example, comprises an input switch array 110 and an output switch array 112 controlled by controller 114.

The input probe signal 10 is directed by the input switch array 110 towards a single one of the plurality of parallel channels 30. The probe signal 10 after passing through the selected channel 30 is directed by the output switch array 112 to a measurement device comprising the addition circuitry 4 and the detection circuitry 8.

The input switch array 110 comprises a ring filter 116 associated with each channel 30. The ring filters 116 have different resonances. A ring filter can be controlled by controller 114 to selectively resonate and couple the probe signal 10 to a waveguide that provides the light through a particular associated channel 30.

The output switch array 112 comprises a ring filter 116 associated with each channel 30. The ring filters 116 have different resonances. A ring filter can be controlled by controller 114 to selectively resonate and out-couple the probe signal 10 from the waveguide that provides the light through the associated channel 30.

The resonance of a ring filter can be tuned using current controlled phase shifters 118.

The ring filters 116 at the input switch array 110 and the output switch array 112 associated with a particular channel 30 are paired so that they have the same resonance.

Thus the selection of which pair of ring filters is in resonance (i.e. which channel 30 is selected) is determined by the value of the current intensity provided by the controller 114.

If the plurality of photonic microring resonators 100 in the different parallel channels 30 have different resonant frequencies, then the controller 114 may be used to select the channel 30 that comprises the photonic microring resonator 100 that is closest to resonance.

If the plurality of photonic microring resonators 100 in the different parallel channels 30 have different Q-values, then the controller 114 may be used to select the channel 30 that comprises the photonic microring resonator 100 that has the highest Q-value and that is still in resonance.

The above described examples of the apparatus 2 may have a number of advantages.

For example, the addition circuitry 4 and the processing circuitry 6 may be integrated onto a chip with the light source 3, couplers, at least one microring resonator 100, and detection circuitry 8 (as illustrated in FIG. 2). The apparatus 2 may be a module. As used here 'module' refers to a unit or apparatus that excludes certain parts/components that would be added by an end manufacturer or a user.

The simultaneous measurement of different combinations of a probe signal 10 and reference signal 20 where different phase differences are induced between the probe and the reference allows rejection of random (but equal for each measurement) noise terms. This enables the use of cheap non-stabilized/noisy sources and fluctuations of the sources Thus the use of the addition circuitry 4 may make the apparatus 2 insensitive to intensity and wavelength fluctuations of the source 3. This may allow longer integration times at detection circuitry 8, which in turn may allow the use of a lower intensity source 3, such as a low power laser.

The use of balanced detectors 82 enables the complex value of T to be calculated with immunity from variations in the source 3 ($\phi = \arctan(<X>/<Y>)$).

The simultaneous measurement of S and R provides an absolute value of the transmission coefficient that is immune from variations in the source.

The apparatus 2 is configured to quantify a phase change (refractive index) and amplitude change (absorption) algebraically and, potentially, over a larger dynamic range. It can provide source independence and can enable the use of lower intensity sources.

The lower limit for the power may be few times the Noise Equivalent Power (NEP) of the detectors integrated over the detection bandwidth (inverse of the integration time).

Figure 9:
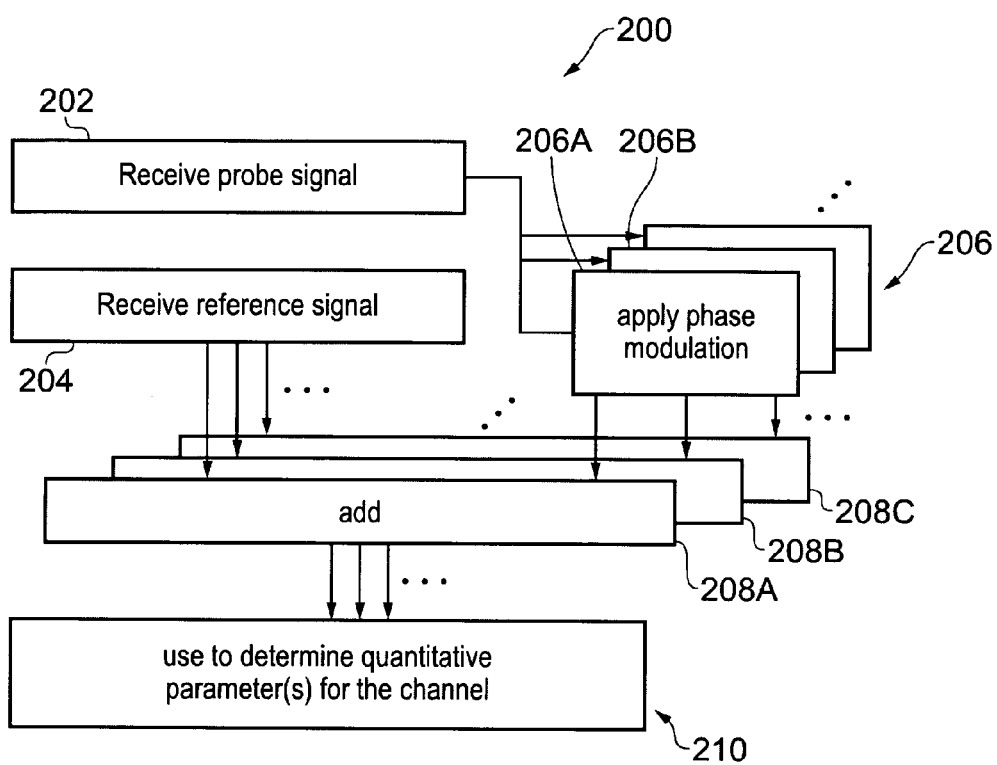
FIG. 9 illustrates an example of a method.

FIG. 9 illustrates an example of a method 200 that illustrates the process previously described with reference to apparatus 2.

The method 200 comprises: at block 202 receiving a probe signal 10 that has passed through a channel 30 having a complex transmission; and at block 204 receiving a reference signal 20.

Then, at block 206A, applying a first phase modulation (complex differential weighting) 44 to the received probe signal 10 and at block 208A combining the modulated probe signal 45 and the reference signal 20, to produce a first resultant signal 40.

Additionally, at block 206B applying a second phase modulation (complex differential weighting) 44 to the received probe signal 10 and at block 208B combining the modulated probe signal 45 and the reference signal 20, to produce a second resultant signal 40.

The blocks of applying a phase modulation (complex differential weighting) 44 to the received probe signal 10 (block 206) and combining the modulated probe signal 45 and the reference signal 20, to produce a resultant signal 40 (block 208) may be repeated for additional different phase modulations 44 as previously described.

At block 210, using the resultant signals 40 to determine one or more quantitative parameters dependent upon the complex transmission for the channel 30.

Although embodiments of the present invention have been described in the preceding paragraphs with reference to various examples, it should be appreciated that modifications to the examples given can be made without departing from the scope of the invention as claimed.

In some but not necessarily all embodiments, the source 3 is an optical source, the channel 30 is an optical channel, the probe signal 10 is an optical signal, the reference signal 20 is an optical signal, the addition circuitry 4 is optical circuitry and the detectors 8 are optical detectors. However, in other embodiments alternative electromagnetic signals may be used instead of optical signals and appropriate channel 30, addition circuitry 4 and detection circuitry 8 would then be used.

'Optical' is used to mean an electromagnetic spectrum that is between 300 nm and 1400 nm.

The optical spectrum includes within it the visible spectrum (390 nm-750 nm) and the near infra red spectrum (750 nm-3000 nm).

An optical source 3 may operate at any wavelength or wavelengths within the optical spectrum (300 nm-3000 nm).

An optical source 3 may be a visible light source and operate at any wavelength or wavelengths within the visible spectrum (390 nm-750 nm).

An optical source 3 may be a infra red (IR) light source and operate at any wavelength or wavelengths within the near infrared spectrum (750 nm-3000 nm).

An example of a channel 30 has been described with reference to FIG. 7 and also FIG. 8. However, the channel 30 may be, for example, bulk materials, liquid, gas, waveguides including fiber, thin films or any sort of resonator. It could also be used to measure the transmission of one polarization of light compared to the other by using a polarization beam splitter and using one polarization as the reference signal 20 the perpendicular one as the probe signal 10.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   addition circuitry configured to receive a probe signal that has passed through a channel having a complex transmission and a reference signal and configured to produce at least: a plurality of weighted additions comprising an addition of the probe signal and the reference signal with different relative phase rotations applied before addition between the probe signal and the reference signal, wherein each of the plurality of weighted additions comprises an addition, differently weighted, of the same probe signal and the same reference signal wherein the probe signal and the reference signal are contemporaneous; and
   processing circuitry configured to use at least two of the plurality of weighted additions to determine a first quantitative parameter for the channel dependent upon the complex transmission for the channel.

2. The apparatus of claim 1, wherein the different relative phase rotations is $(2n+1)\pi/2$ where n is a whole number.

3. The apparatus of claim 1, wherein
   a first addition, of the plurality of weighted additions, is equivalent to an addition of the probe signal and the reference signal with a first phase rotation induced between the probe signal and the reference signal before addition;
   a second addition, of the plurality of weighted additions, is equivalent to an addition of the probe signal and the reference signal with a second phase rotation induced between the probe signal and the reference signal before addition;
   a third addition, of the plurality of weighted additions, is equivalent to an addition of the probe signal and the reference signal with a third phase rotation induced between the probe signal and the reference signal before addition;
   a fourth addition, of the plurality of weighted additions, is equivalent to an addition of the probe signal and the reference signal with a fourth phase rotation induced between the probe signal and the reference signal before addition,
   wherein the relative difference between the first phase rotation and each of the second, third and fourth phase rotations is $\pi/2$, $\pi$ and $3\pi/2$.

4. The apparatus of claim 3, further comprising a first balanced detector comprising a detector configured to detect a first intensity of a signal corresponding to the first addition and a detector configured to detect a third intensity of a signal corresponding to the third addition and a second balanced detector comprising a detector configured to detect a second intensity of a signal corresponding to the second addition and a detector configured to detect a fourth intensity of a signal corresponding to the fourth addition, wherein the first balanced detector is configured to provide as a first input to the processing circuitry a difference between the first intensity and the third intensity and the second balanced detector is configured to provide as a second input to the processing circuitry a difference between the second intensity and the fourth intensity.

5. The apparatus of claim 4, wherein the processing circuitry is configured to determine transmission phase using the first input and the second input.

6. The apparatus of claim 1, wherein the processing circuitry is configured to use a measured intensity of a second reference signal produced from a first reference signal that is divided to produce the reference signal and the second reference signal.

7. The apparatus of claim 1, wherein a first probe signal is divided to produce the probe signal and a second probe signal and wherein the processing circuitry is configured to use the second probe signal to determine a transmission amplitude for the channel dependent upon the complex transmission for the channel.

8. The apparatus of claim 1, wherein the reference signal and probe signal originate from the same source.

9. The apparatus of claim 8, wherein the source is a fixed wavelength source.

10. The apparatus of claim 1, wherein the addition circuitry is optical circuitry, the channel is an optical channel and the probe signal and the reference signal are optical signals.

11. The apparatus of claim 1, wherein the channel having a complex transmission comprises a photonic microring resonator.

12. The apparatus of claim 1, comprising selection circuitry configured to select which of a plurality of photonic microring resonators of different resonant frequencies defines the channel having a complex transmission.

13. The apparatus of claim 1, comprising selection circuitry configured to select which of a plurality of photonic microring resonators of different Q-values defines the channel having a complex transmission.

14. The apparatus of claim 1, wherein the addition circuitry and the processing circuitry are integrated onto a chip with a light source, couplers, at least one microring resonator, and detectors.

15. A method comprising:
   receiving a probe signal that has passed through a channel having a complex transmission;
   receiving a reference signal;
   combining the probe signal and the reference signal, after applying a first phase rotation between the probe signal and the reference signal, to produce a first resultant signal;
   combining the probe signal and the reference signal, after applying a second phase rotation between the probe signal and the reference signal, to produce a second resultant signal;
   wherein each combining is of the same probe signal and the same reference signal, wherein the first phase rotation and second phase rotation are different, and wherein the probe signal and the reference signal are contemporaneous; and
   using at least the first resultant signal and the second resultant signal to determine a first quantitative parameter for the channel dependent upon the complex transmission for the channel.

16. The method of claim 15, comprising:
   providing the received reference signal and the received probe signal from the same fixed frequency source.

17. The method of claim 15, wherein the first phase rotation and the second phase rotation are different by $\pi/2$.

18. The method of claim 15, comprising:
   combining the probe signal and the reference signal, after applying a third phase rotation between the probe signal and the reference signal, to produce a third resultant signal;

combining the probe signal and the reference signal, after applying a fourth phase rotation between the probe signal and the reference signal, to produce a fourth resultant signal, wherein a difference between the second phase rotation and the first phase rotation is $\pi/2$, a difference between the third phase rotation and the first phase rotation is $\pi$ and a difference between the fourth phase rotation and the first phase rotation is $3\pi/2$.

19. An apparatus comprising:

addition circuitry configured to receive a probe signal that has passed through a channel having a complex transmission and a reference signal and configured to produce at least: a plurality of weighted additions comprising an addition of the probe signal and the reference signal, wherein a differential complex weighting is applied before addition to one of the probe signal and the reference signal but not to the other of the probe signal and the reference signal, and wherein each of the plurality of weighted additions uses a different differential complex weighting of the same probe signal and the same reference signal wherein the probe signal and the reference signal are contemporaneous; and processing circuitry configured to use at least two of the plurality of weighted additions to determine a first quantitative parameter for the channel dependent upon the complex transmission for the channel.

* * * * *